March 26, 1968     C. R. FEGLEY     3,374,924

APPARATUS FOR JOGGING AND DISPENSING ARTICLES FROM A RACK

Filed Aug. 23, 1966     6 Sheets-Sheet 1

INVENTOR
C. R. FEGLEY
By R. P. Miller
ATTORNEY

March 26, 1968  C. R. FEGLEY  3,374,924
APPARATUS FOR JOGGING AND DISPENSING ARTICLES FROM A RACK
Filed Aug. 23, 1966  6 Sheets-Sheet 2

March 26, 1968     C. R. FEGLEY     3,374,924
APPARATUS FOR JOGGING AND DISPENSING ARTICLES FROM A RACK
Filed Aug. 23, 1966     6 Sheets-Sheet 5

March 26, 1968  C. R. FEGLEY  3,374,924
APPARATUS FOR JOGGING AND DISPENSING ARTICLES FROM A RACK
Filed Aug. 23, 1966  6 Sheets-Sheet 6

3,374,924
APPARATUS FOR JOGGING AND DISPENSING ARTICLES FROM A RACK

Charles R. Fegley, Laureldale, Pa., assignor to Western Electric Company, Incorporated, New York, N.Y., a corporation of New York
Filed Aug. 23, 1966, Ser. No. 574,357
12 Claims. (Cl. 221—11)

ABSTRACT OF THE DISCLOSURE

A rack containing rows of articles is successively advanced to present each row to a chute having an escapement device which dispenses the articles individually onto an exit trackway. Each dispensed article drops through the chute and is rotated to fall onto the trackway in an oriented position. A cyclically operated sensing brush jogs the articles and senses any jammed articles to insure that all the articles are dispensed from a row before another row of articles is presented to the chute.

---

This invention relates to apparatus for jogging and dispensing articles from a rack, and more particularly to a dispensing apparatus having controls for insuring that each row of articles in a rack is completely dispensed before the rack is indexed to present the next row to a dispensing position.

In the automatic manufacture of small electrical devices, such as transistors, component parts must be loaded and unloaded from mass carriers such as racks. Inasmuch as these components are usually very light and complex in shape, serious problems exist in providing facilities which will automatically and positively dispense and feed these components into fabricating and testing devices. Often these components twist and bind in the carrier to interrupt a desired continuous feed, thus, necessitating constant visual monitoring by an attending operator to detect jams. The jam or lodged component must be manually jogged or removed from the dispensing or feeding apparatus. Further, the attending operator must be extremely attentive in detecting jammed conditions so that the adjunct fabricating or testing devices may be stopped.

It is an object of the present invention to provide a new and improved apparatus for jogging and dispensing articles from a rack.

Another object resides in an apparatus for cyclically indexing a rack to present rows of components to a dispenser together with facilities for interrupting the indexing upon occurrence of a jammed condition.

A further object of the invention resides in a brushing device which cyclically senses articles arrayed in rows in a rack to control the advance of the rack to present each row to a dispensing position.

Concomitant with the last object, the invention contemplates that the brushing device will also function to jog the articles to insure the emptying of each row before another row is advanced into the dispensing position.

An additional object of the invention resides in jogging brush and a photocell detector cooperating together to insure and dispensing of articles from a rack and the subsequent delivery of the articles through a chute onto a conveyor.

With these and other objects in view, the present invention contemplates a dispensing apparatus wherein components arrayed in rows are jogged, sensed, and individually dispensed from each row prior to the advance of another row into a dispensing position. More particularly a rack containing rows of articles is successively advanced to present each row to an escapement device which controls the individual dispensing of the articles onto an exit trackway. A sensing brush is cyclically operated to jog the articles and insure that all the articles are dispensed from a row before another row of articles is presented to the escapement device. Each dispensed article drops through a chute and is rotated to fall onto the trackway in an oriented position. Further, facilities are provided to sense the lodging of an article within the chute. If an article is sensed as being jammed in the rack or lodged in the chute, then the rack advancing facilities are precluded from further operation.

Other objects and advantages of the present invention will be apparent on consideration of the following detailed description when considered in conjunction with the accompanying drawings, wherein.

Figure 1:
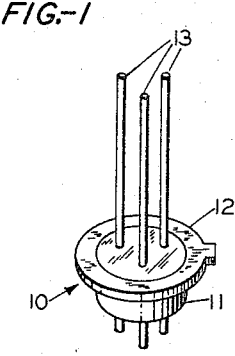
FIG. 1 is a perspective view of a transistor header that may be dispensed by the apparatus shown in the other figures.
Figure 2:
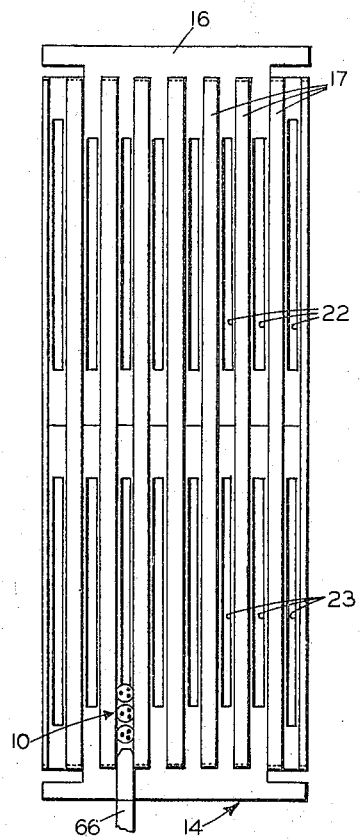
FIG. 2 is a front view of a rack for holding rows of headers to be advanced into the dispensing apparatus.
Figure 3:
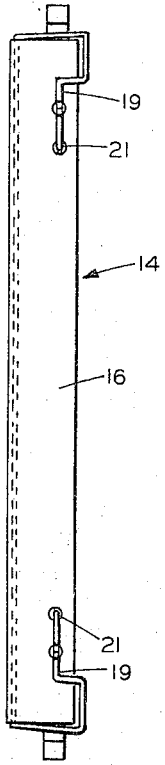
FIG. 3 is a side view of the rack showing movable spring clips for retaining the headers in the rack.
Figure 5:
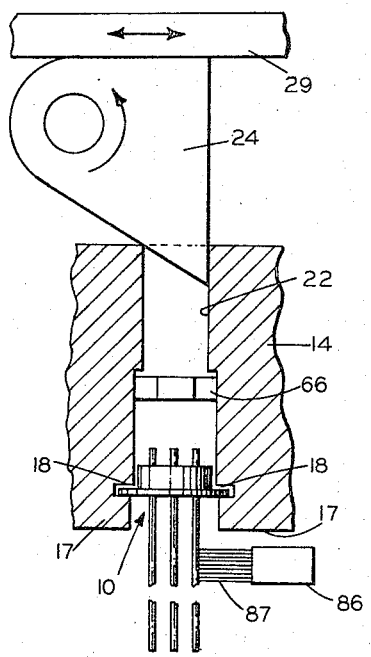
FIG. 5 is an enlarged fragmentary view showing a header in the rack together with a pawl for advancing the rack.
Figure 4:
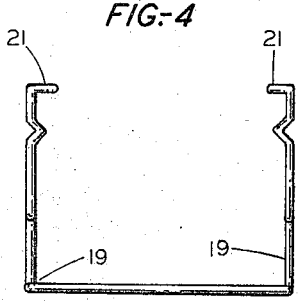
FIG. 4 is an enlarged view of one of the spring clips used to retain the headers in the rack.

Referring first to FIG. 1, there is shown an article, such as a transistor header 10, which may be dispensed by the apparatus constituting the present invention. This header 10 includes a body portion 11 having a flange 12 and three projecting terminal leads 13. The headers 10 are initially loaded either manually or automatically into a rack generally designated by the reference numeral 14 (see FIGS. 2 and 3). This rack consists of a backing plate 16 having a plurality of projecting guide rails 17, each of which is slotted to provide guideways 18 (see FIG. 5) for receiving the flanges 12 of the headers 10. There is shown in FIG. 4, a guide spring clip 19 having inwardly projecting pivots 21 that fit within apertures formed in the sides of the plate 16 as shown in FIG. 3. These spring clips serve to hold the headers 10 from falling out from between the guide rails 17. The plate 16 is provided with two groups of transverse slots 22 and 23 for receiving a pair of indexing pawls 24 which function to engage and advance the rack.

Figure 6:
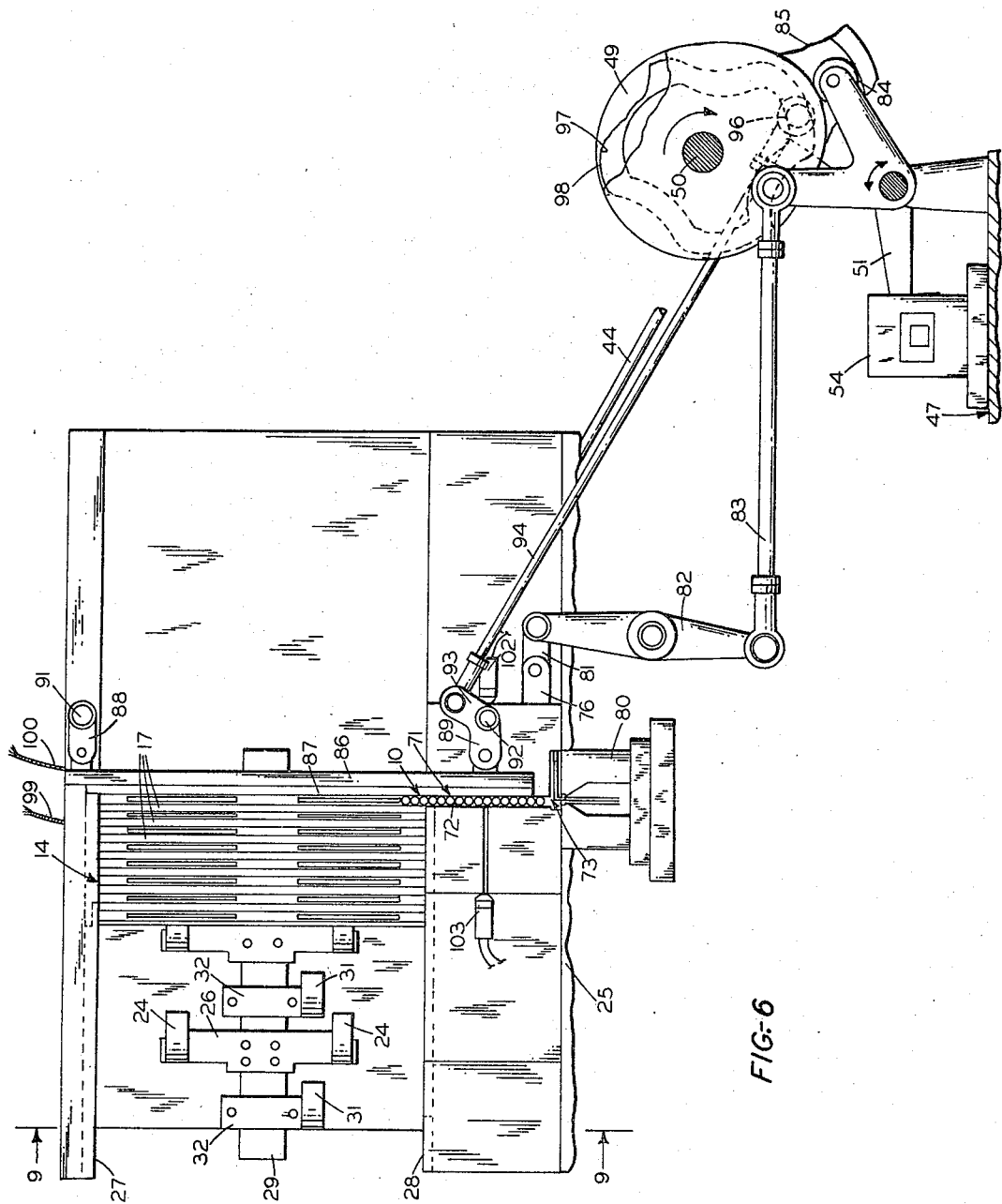
FIG. 6 is a front elevational view of the apparatus for dispensing headers seriatim from each row in the rack, embodying the principles of the present invention.
Figure 7:
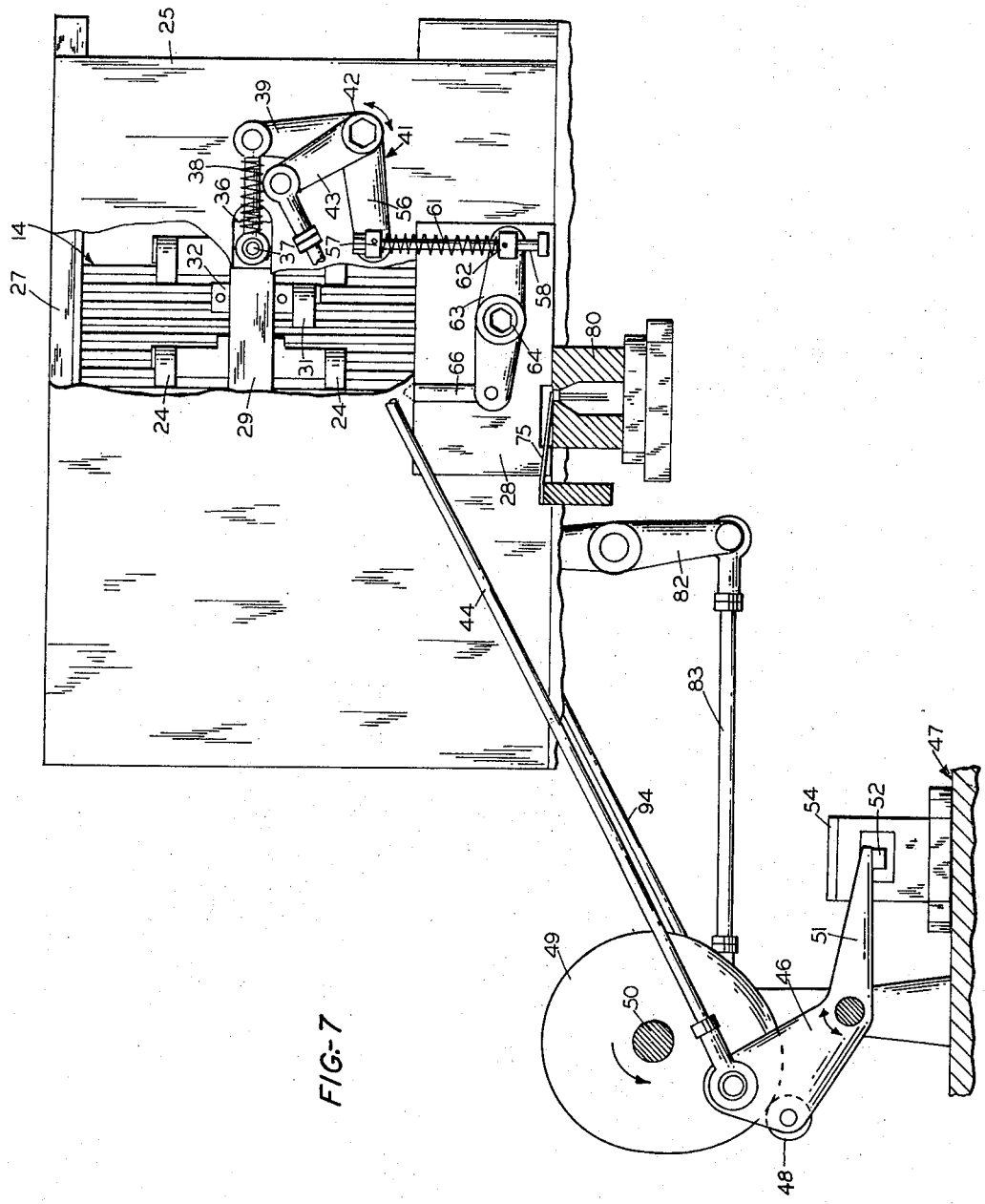
FIG. 7 is a rear elevational view of the dispensing apparatus particularly illustrating a mechanism for actuating the rack pawls to advance rows of headers into position to be dispensed.

Referring now to FIGS. 6 and 7, there is shown apparatus for dispensing each header 10 from the rack 14. This apparatus includes a frame 25 having a pair of trackways 27 and 28 for receiving and supporting racks 14.

In the figures, only one rack is shown in the apparatus, but it is to be understood that a number of racks may be simultaneously loaded between the trackways 27 and 28. The pairs of indexing pawls 24 are pivotally mounted on a crossbar 26 that, in turn, is attached to a slide bar 29. A second group of spring-urged pawls 31 are pivotally mounted on brackets 32 and attached to the frame 25. These pawls 31 are also spring-urged toward and into the slots 23 to prevent retrograde movement of the racks 14 when the pawls 24 are returned to the initial position.

Figure 8:
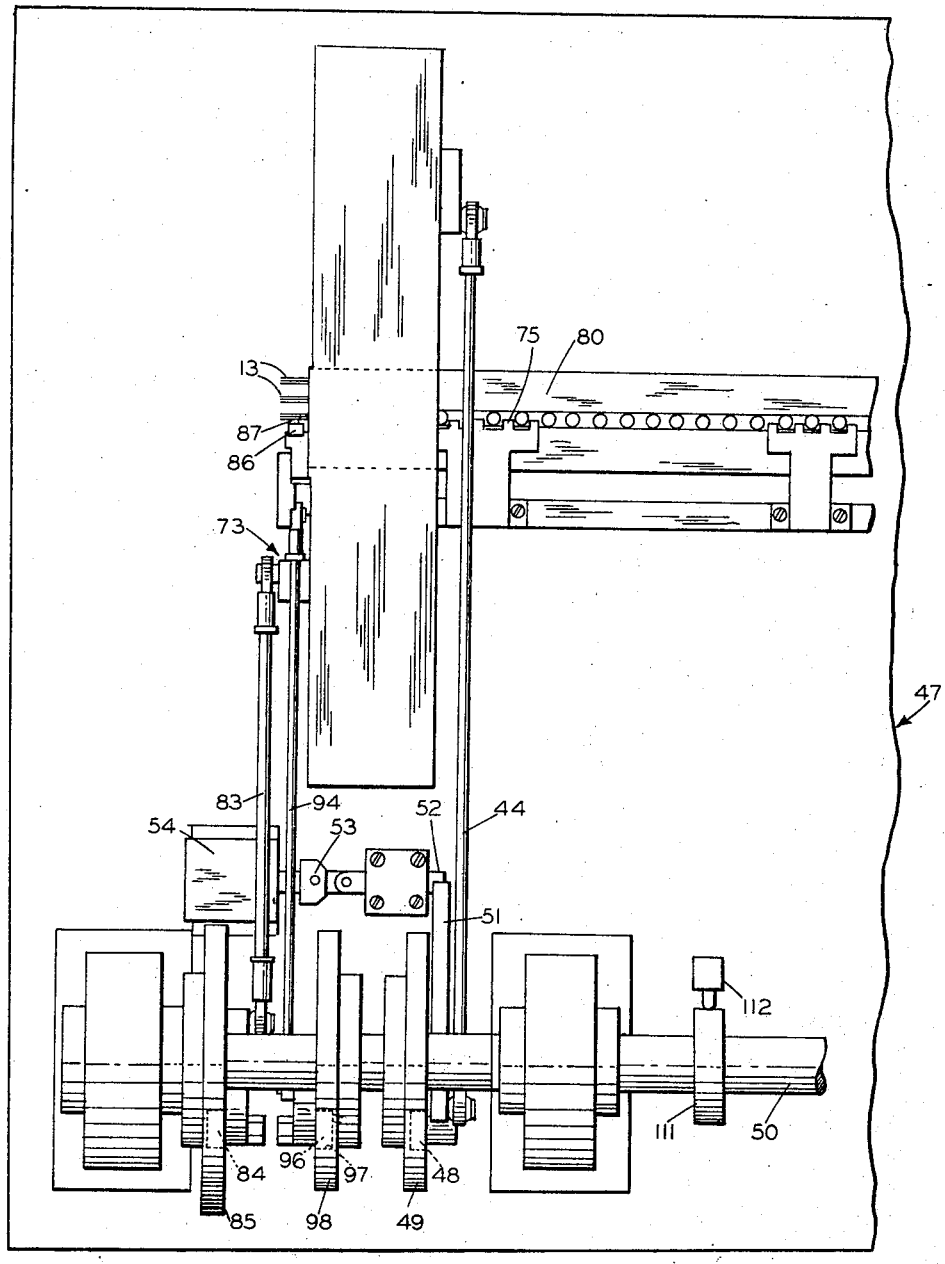
FIG. 8 is a top plan view of the dispensing apparatus shown in FIGS. 6 and 7, depicting cam mechanisms for operating the rack advancing mechanism, an escapement device, and header sensing and jogging facilities.

Referring now to FIGS. 7 and 8, which best illustrate the mechanism for reciprocating the pawls 24, there is shown an extension 36 on the slide bar 29. Mounted on extension 36 is a pintle 37 on which is mounted one end of a spring loaded coupling 38, the other end of which is pivotally mounted on one arm 39 of a multiarm structure 41 pivotally mounted on a stud 42 extending from frame 25. A second arm 43 is pivotally connected to one end of a pushrod 44, the other end of which is pivotally connected to a plate 46 that is pivotally mounted on a base 47 for the over-all machine. Plate 46 has rotatably mounted thereon a cam follower roller 48 that tends to ride on the periphery of a cam 49 keyed to a shaft 50, but is usually precluded from riding on the periphery by plate extension arm 51 engaging a latch bar 52 connected to an armature 53 of a solenoid 54. Thus, the cam 49 is ineffective to oscillate the pushrod 44 to reciprocate pawls 24 to advance the rack until the latch bar 52 is withdrawn by operation of the solenoid 54.

Considering further the multi-arm structure 41, it is provided with an additional arm 56 (see FIG. 7) having a collar 57 attached thereto. Extending through the collar 57 is a slide bolt 58 about which is mounted a spring 61. The spring 61 bears against the collar 57 as well as against a collar 62 connected to a lever 63 mounted on a stud shaft 64. The free end of the lever 63 is pivotally attached to a rack locator pin 66 (see also FIG. 2) which is positioned to slide into the space between a pair of adjacent guide rails 17 on the rack 14. The rack locator pin 66 has a bevelled tip to accurately position the rack to locate a row of headers in position for dispensing. This rack locator pin also functions to hold the rack in position during the dispensing operation.

When the latch 52 is withdrawn and the pushrod 44 is permitted to be oscillated by the cam 49, then the multi-arm structure 41 pivots first in a clockwise direction as viewed in FIG. 7 so that the lower head of the slide bolt 58 acts on the collar 62 to pivot the lever 63 to withdraw the rack locator pin 66. At this time, the arm 39 through the coupling 37 moves the slide bar 29 toward the right, thus, withdrawing the pawls 24 which are normally spring-urged into engagement with the back side of the rack 14. Upon reversal of movement of the multi-arm structure 41, due to further rotation of the cam 49, the slide bar 29 moves toward the left and the pawls 24 will immediately move into the slots 22 and 23 to initiate advance of the rack 14. The arm 56 will move down so that the collar 57 compresses the spring 61, after the pawls 24 have initiated the advance of the rack 14. This delay is permitted because the slide bolt 58 is longer than the spring 61 and it will be appreciated that no motion is transmitted to the lever 63 until the spring 61 is compressed. At this time, the rack locator pin is riding on the end of the interposed guide rail 17. The spring 61 will be compressed so that when the paws 24 advance the rack to position the space between the next pair of guide rails 17 over the end of the pin 66, this pin will instantly move up between these guide rails to again lock the rack 14 in position.

Figure 10:
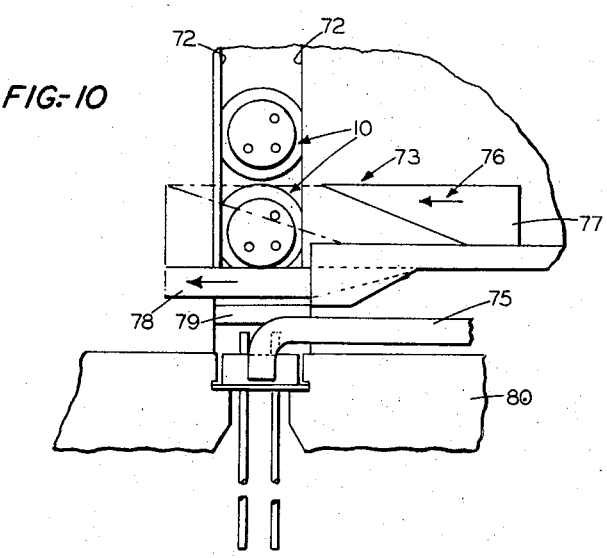
FIG. 10 is an enlarged fragmentary view of the escapement mechanism for dispensing individual headers from a row in the rack.
Figure 11:
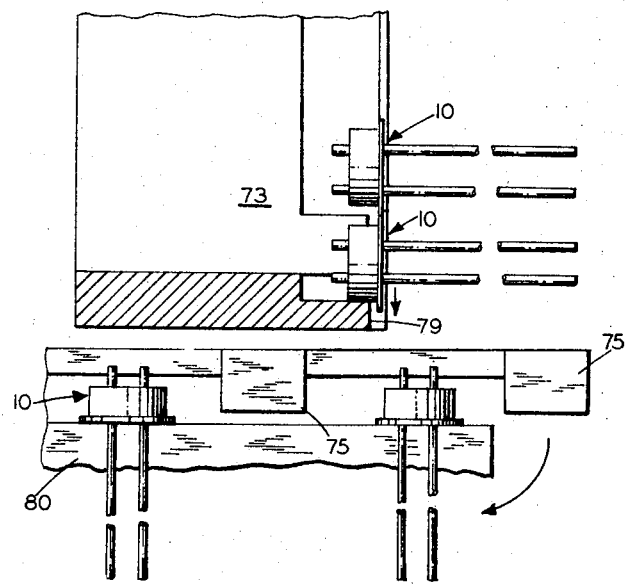
FIG. 11 is a fragmentary view illustrating a dispensed header dropping and rotating 90° onto a receiving trackway.

As best shown in FIG. 6, the rack 14 advances each successive row of headers 10 into a dispensing position generally designated by the reference numeral 71. The headers in the advanced row are dropped into a guideway 72 terminating in an escapement device generally designated by reference numeral 73. The details of the escapement device are clearly illustrated in FIG. 10, and as there shown, include a slide block 76 having a bevelled retainer plate 77 and a stop plate 78 formed or attached thereto. When the slide block 76 is shifted to the left as viewed in FIG. 10, the tip of the retainer plate 77 moves to engage the next lowermost header 10 to retain the row of headers in the guideway 72. The lowermost header 10 rides over the shifting stop plate 78 and drops onto an orienting projection 79. The header 10 strikes the projection 79 and pivots 90° as illustrated in FIG. 11 onto a trackway 80 leading from the dispensing apparatus into other fabricating devices, one of which may be of the type illustrated in applicant's copending application Ser. No. 530,729, filed Feb. 28, 1966. Reciprocating fingers 75 (see FIG. 10) may be cyclically operated to move the deposited headers 10 along the trackway 80.

The escapement device 73 is cyclically operated to reciprocate the slide block 76. This reciprocation is accomplished by a cam driven linkage, as illustrated in FIGS. 6 and 8, which include a link 81 connected to one end of a lever 82, the other end of which is connected to a pushrod 83 having a cam follower 84 riding in a cam track formed in the side of a cam 85. The cam track is designed to reciprocate the escapement slide block 76, once during each rotation of the cam 85.

Figure 9:
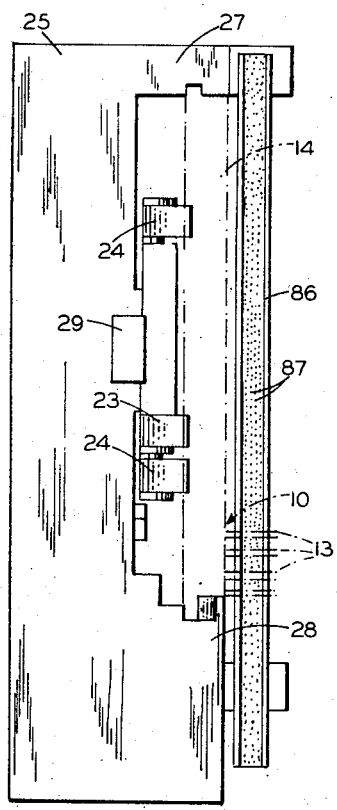
FIG. 9 is a sectional view taken along line 9—9 of FIG. 6 showing an oscillatory brush for sensing and jogging the headers positioned in a row positioned to be dispensed.

Recalling that the headers have very thin flanges 12 and long projecting leads 13, there is a tendency for the headers to twist and jam in the racks 14 and not fall into the guideway 72. A jogging brush 86 (see FIGS. 6 and 9) is positioned adjacent the row of headers 10 in the dispensing position to facilitate the full discharge of each row of headers. This brush has metallic bristles 87 projecting toward the terminal leads 13 extending from each header (see also FIG. 5). The upper and lower back portions of the brush 86 are respectively connected to links 88 and 89 pivotally mounted on stud shafts 91 and 92 projecting from the frame 25. Link 89 has an extension 93 that is pivotally connected to one end of a pushrod 94. The other end of the pushrod has mounted thereon a cam follower 96 that rides in an undulating cam trackway 97 formed in a cam disc 98 mounted on the cam shaft 50. The cam trackway 97 is designed to move the pushrod 94 back and forth to pivot the link 89 and thus impart an oscillatory motion to the brush 86 so that the bristles 87 will engage the projecting leads 13 to jog the headers 10 so as to alleviate any possibility of jamming or binding in the rack 14 or in the trackway 72.

Figure 12:
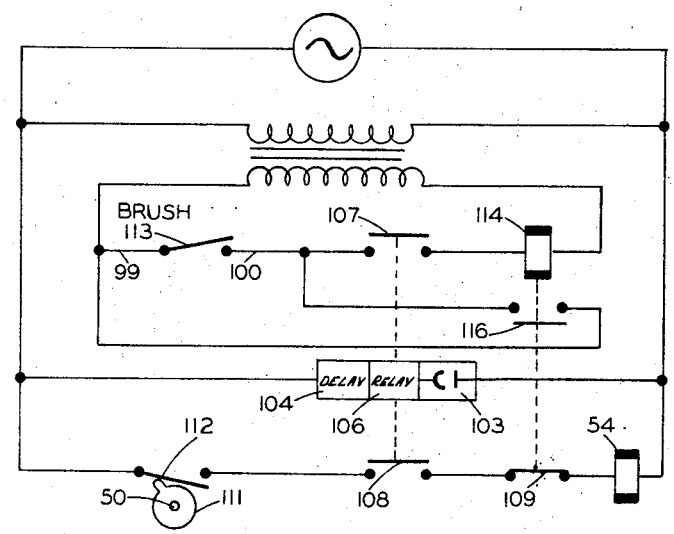
FIG. 12 is a circuit schematic showing controls for advancing the rack to present successive rows of headers to the dispensing position.

The brush 86 is connected electrically by leads 99 and 100 to control the operation of the circuit shown in FIG. 12 which functions to selectively energize the solenoid 54 that controls the position of the bar 52. A light source 102 (see FIG. 6) and an aligned photocell 103 cooperate to detect the presence of headers 10 in the guideway 72. When the brush 86 does not sense any headers in the dispensing position and the photocell 103 does not detect any headers in the guideway 72, the circuit shown in FIG. 12 is rendered effective to withdraw the latch 52 and, as a consequence, the pawls 24 are advanced to move a new row of headers 10 into position.

An understanding of the over-all operation of the machine may be enhanced by the reference to the circuit diagram in FIG. 12, when considered in conjunction with FIGS. 6, 7, and 8. An attending operator will load racks 14 filled with headers 10 between trackways 27 and 28. A beveled surface or a cam surface cut into the trackways 28 cams back the spring clip 19 from engagement with the lower headers 10 in the rack 14. The leading row of headers is now positioned in the dispensing position 71 and will drop down through the guideway 72. The forward header 10 comes to rest against the stop plate 78 (see FIG. 10) of the escapement device 73. The cam shaft 50 is initiated to rotation by energization of a suitable drive motor (not shown).

Rotation of the shaft 50 rotates the cam 85 to reciprocate slide block 76 of the escapement device 73 (see FIGS. 10 and 11) whereupon the stop 78 is withdrawn from the lower header 10 allowing this header to drop onto the orienting projection 79. The header pivots 90° and falls onto the trackway 80 where a reciprocating pusher finger 75 moves the header along the trackway 80 to other fabricating devices.

Rotation of the shaft 50 is also imparted to the cam 98 to oscillate pushrod 94 and cyclically move the brush 86 toward and away from the leads 13 projecting from the headers 10 positioned both in the dispensing position 71 and in the guideway 72. The bristles 87 of the brush 86 jog the headers 10, thus preventing jamming and insuring the dispensing of all of the headers positioned between the guide rails 17 and in the guideway 72.

The presence of headers 10 in the guideway 72 is sensed by means of light source 102 impinging on the photocell 103. This photocell arrangement (see FIG. 12) is of a well-known commercial manufacture and has a time delay component 104 so that it will not operate a control or output relay coil 106 until it receives a steady beam of light for a predetermined period of time, for example, two seconds, which indicates that there are no more headers 10 in the row at the dispensing position 71. The time delay feature precludes the on-off operation of the relay coil 106 as the header drops down into the escapement device 73. If the row of headers is completely dispensed and the time delay period has elapsed, then the photoelectric cell 103 energizes the relay 106 which draws up a contact 107 and a contact 108. Closure of contact 108 conditions a circuit through a normally closed contact 109 to the solenoid 54. A timing cam 111 mounted on the shaft 50 closes a contact 112 to complete the conditioned circuit to the solenoid 54. Energization of solenoid 54 withdraws the latch 52 from the extension arm 51. (See FIG. 7.) Release of arm 51 permits the cam follower 48 to ride on the surface of the cam 49 thus the plate 46 will be oscillated. The contour of the cam 111 is selected to close the switch 112 at the time that the cam 49 presents its lobe portion to the cam follower 48, thus the cam follower 48 will not have to drop any appreciable distance in order to engage the cam surface 49. The oscillation of the plate 46 (see FIG. 7) is imparted through the pushrod 44 and the multi-arm structure 41, and through the coupling 37 to reciprocate the slide bar 29. The slide bar 29 moves the spring biased pawl 24 toward the right as viewed in FIG. 7 (or toward the left as viewed in FIG. 6) and then toward the left whereupon the pawls 24 drop into the slots 23 to move the rack 14 one increment to position a new row of headers 10 in the dispensing position 71. These headers will drop into guideway 72 and be individually dispensed by subsequent operation of the escapement mechanism 73.

If one or more of the headers 10 become jammed between the guide rails 17, or in the guideway 72, then the metallic bristles 87 of brush 86 will engage the leads 13 to complete an electrical circuit diagrammatically illustrated in FIG. 12 by the contact 113. Closure of the contact 113 and subsequent closure of the contact 107 of the photoelectric controlled relay coil 106, result in the completion of the circuit to a relay coil 114. Energization of relay coil 114 draws up a contactor 116 to complete a circuit around brush detector contacts 113 to maintain the relay coil 114 energized. Energization of relay coil 114 also opens the contactor 109 to preclude the energization of the solenoid 54 thereby precluding the subsequent indexing of the rack 14. The attending operator can now manually dislodge the jammed header 10 to permit the subsequent cyclicalling of the over-all dispensing machine. It may be thus appreciated that the brush 86 serves two functions; one, to dislodge jammed headers 10 and, secandly, acts to preclude the subsequent indexing of the rack 14 upon a header becoming so jammed or lodged in the rack that it cannot be released by the cyclic movement of the brush 86. It is to be understood that energization of the relay coil 114 may draw up other contacts to operate an alarm and/or operate other interlocking circuits that control other fabricating devices that operate on the headers advanced along trackway 80.

It is to be understood that the above-described arrangement of structure and construction of elemental parts are merely illustrative of an application of the principles of the present invention and that many modifications may be made without departing from the invention.

What is claimed is:

1. In a device for dispensing rows of articles loaded in a rack,
   a discharge guideway,
   a trackway extending to said guideway for supporting said rack in a vertical position,
   means for incrementally advancing said rack to present each row of articles to said discharge guideway,
   means for cyclically engaging and jogging the row of articles presented to said discharge guideway to insure discharge from the rack into the guideway, and
   means operated by said cyclic means engaging an article for precluding operation of said incremental advancing means.

2. In a device as defined in claim 1 wherein,
   said cyclically engaging and jogging means also engages and jogs the articles in the discharge guideway.

3. In a device as defined in claim 1 including
   means for sensing the presence of an article positioned in said discharge guideway, and
   means operated by said sensing means failing to sense the presence of an article after elapse of a predetermined period of time for operating said incremental advancing means.

4. In a device as defined in claim 1 wherein said cyclic engaging and jogging means comprises an elongated bar having a brush mounted thereon to engage said row of articles presented to said discharge guideway.

5. In a device as defined in claim 4 wherein said articles are electrically conductive and said brush is electrically conductive, and said device also includes,
   means for sensing the presence of an article positioned in said discharge guideway,
   an electrical circiut that is completed by said brush contacting an article and said sensing means failing to sense said article in said discharge guideway during a predetermined elapse of time, and
   means operated by completion of said circuit for precluding operation of said incremental advancing means.

6. In an apparatus for dispensing rows of articles arrayed in a rack,
   an escapement device for dispensing each article advanced thereto,
   means mounting said rack for advancing each row into alignment with said escapement device,
   means for moving said rack to successively advance said rows into alignment with said escapement device,
   means for cyclically operating said escapement device to dispense said articles from an aligned row in said rack,
   a brush mounted for movement relative to a row of articles aligned with said escapement device,
   means for cyclically moving said brush to engage and jog articles in said aligned row, and
   means rendered effective upon said brush failing to engage an article in said aligned row for operating said moving means to advance said rack to position another row of articles in alignment with said escapement device.

7. In an apparatus for dispensing articles arrayed in rows in a rack,
   a discharge chute,
   means movably mounting said rack for rectilinear movement to present each row to said discharge chute,
   a feed pawl device for engaging and moving said rack along said mounting means to present each succeeding row of articles to said discharge chute.

a cyclically operable means for actuating said pawl device, a removable stop for engaging said cyclically operable means to preclude operation of said feed pawl device, means for periodically sensing the presence of articles in the entire row presented to said discharge chute, and means responsive to said sensing means failing to sense an article for removing said stop to render said cyclically operable means effective to actuate said feed pawl device.

8. In an apparatus of the type defined in claim 7 wherein there is, a sensing means for ascertaining the presence of an article in said chute, and means actuated by said last defined sensing means ascertaining the presence of an article in said chute for precluding operation of said stop removing means.

9. In a rack dispensing device wherein the rack comprises a back plate and a plurality of spaced article receiving guide rails, each pair of which span a slot extending into the back plate, a pair of spaced trackways vertically supporting said rack for movement to present each pair of guide rails to a dispensing position, a slide bar having mounted thereon a plurality of spring urged pawls biased to move within the slots formed in said back plate, a locator pin slidably mounted to enter the space between a pair of guide rails to engage said guide rails, means for reciprocating said slide bar to move said pawls into said slots, on a forward stroke of said slide bar, to advance said rack to advance each succeeding pair of adjacent guide rails into the dispensing position, and means operated by said reciprocating means for withdrawing the locator pin from between said guide rails during said forward stroke and for moving the locator pin between said guide rails during a rearward stroke of said slide bar.

10. In an apparatus for dispensing articles from a plurality of parallel rows in a carrier, a discharge chute, means for advancing said carrier incrementally to discharge each row of articles seriatim into said chute electromechanical means for operating said carrier advancing means, a first switching means in series with said electromechanical means and being in a normally open-circuited condition, a second switching means in series with said first switching means and being in a normally closed-circuited conditions, means for connecting a source of electrical energy in series with said first and second switching means and said electromechanical means, for operating said electromechanical means, a first article sensing means rendered operable upon the failure to detect the presence of an article in the chute to close said normally open first switching means and energize said electromechanical means to operate said carrier advancing means, and a second article sensing means rendered operable upon the operation of said first article sensing means and upon the detection of a jammed article in the discharging row or the chute to open said normally closed second switching means to preclude the energization of said electromechanical means.

11. An apparatus of the type defined in claim 10 wherein the articles are electrically conductive, and said second sensing means includes an electrical circuit which is completed through a jammed article.

12. An apparatus of the type defined in claim 10 wherein, said first sensing means includes means to preclude the closing of said normally open first switching means for a predetermined time.

References Cited

UNITED STATES PATENTS

| | | | |
|---|---|---|---|
| 2,385,267 | 9/1945 | Franz | 221—11 |
| 2,894,361 | 7/1959 | Ullman et al. | 221—200 X |
| 3,077,287 | 2/1963 | White | 221—11 X |

SAMUEL F. COLEMAN, *Primary Examiner.*